Nov. 3, 1964
S. S. KURPIT ET AL
3,155,723
SYNTHESIS OF UREA AND RECOVERY OF RESIDUAL REACTANTS
Filed Feb. 4, 1960
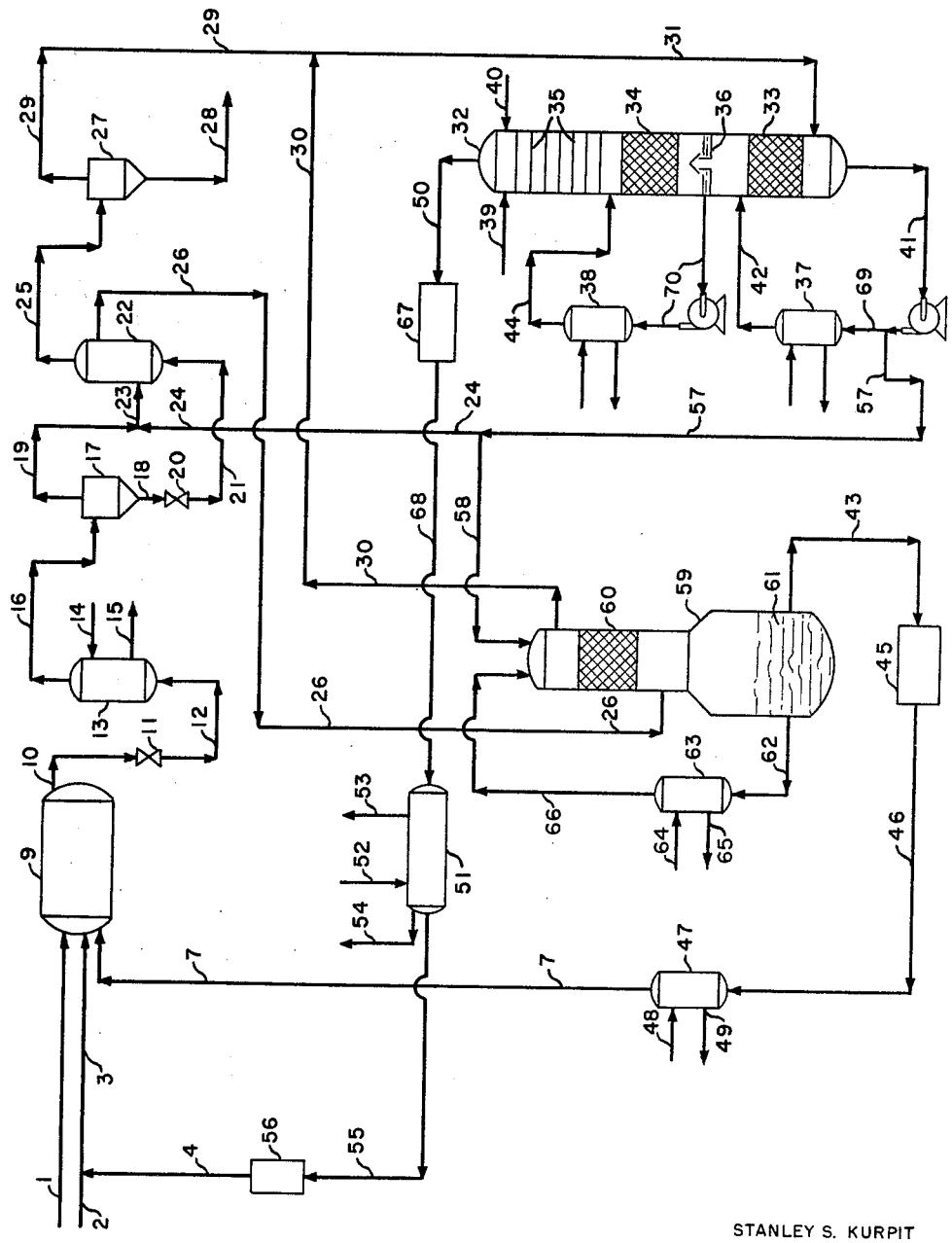
STANLEY S. KURPIT
IVO MAVROVIC
STANLEY J. SAFFIAN
INVENTORS.
BY J. I. Chaboty.
AGENT 3,155,723
SYNTHESIS OF UREA AND RECOVERY OF
RESIDUAL REACTANTS
Stanley S. Kurpit, Brooklyn, and Ivo Mavrovic and Stanley J. Saffian, New York, N.Y., assignors to Chemical Construction Corporation, New York, N.Y., a corporation of Delaware
Filed Feb. 4, 1960, Ser. No. 6,644
6 Claims. (Cl. 260—555)

This invention relates to improvements in the manufacture of urea from ammonia and carbon dioxide. A new process of treatment of off-gases has been developed, in which these off-gases are completely recycled to the process after partial condensation in a system which separates a recycle ammonia stream free of carbon dioxide. Considerable improvement in heat and power economy is achieved in the present invention as compared to prior complete recycle urea processes, since dilution or the use of a carrier medium for ammonium carbamate recycle is avoided.

Urea is snythesized commercially by the reaction of ammonia with carbon dioxide at elevated pressure and temperature. In this process ammonium carbamate is formed as an intermediate compound, which upon loss of water yields urea. The reaction proceeds according to the following equations:

(1) $2NH_3 + CO_2 \rightarrow NH_2COOH_4$ (ammonium carbamate)
(2) $NH_2COONH_4 \rightarrow NH_2CONH_2$ (urea) $+ H_2O$ Equation 1 shows the formation of the intermediate compound ammonium carbamate. This is a rapid reaction under the usual process conditions, and readily goes to completion. However, Equation 2, the dehydration of ammonium carbamate to yield urea and water, is a comparatively slow reaction under the usual process conditions, and does not readily go to completion in practice. Thus the effluent from the high-pressure urea synthesis vessel contains a significant proportion of ammonium carbamate as well as urea product. The ammonium carbamate is readily separated from the liquid urea product by heating, which decomposes the ammonium carbamate by a reversal of Equation 1 and generates an off-gas containing ammonia and carbon dioxide. The subsequent processing of this off-gas is relatively difficult, since at lower temperatures and pressures the components ammonia and carbon dioxide readily recombine to form ammonium carbamate as a solid. Various procedures for disposal or recycle of the off-gas have been devised in the past.

One of the earliest commercial processes involved the complete recycle and recompression of the off-gas stream as a gas at elevated temperature. Various mechanical difficulties were encountered due to condensation of solid carbamate and accelerated corrosion. The basic power requirements were high, due to inherent low efficiency in compressing large volumes of hot gas to high pressure.

Other processes involve recycle of the gases after condensation in a liquid solution or slurry. An aqueous slurry process was one of the earliest commercial procedures, and the use of an inert mineral oil as a slurrying agent for solid carbamate recycle forms the basis of another more recent process. Another process of current interest recovers and absorbs the entire off-gas in a scrubbing solution comprising liquid ammonia, with the possible addition of water as a subsequent scrubbing agent. These procedures result in excessive dilution of the process stream hence output per unit of autoclave volume is reduced and larger pressure vessels must be provided. When excess water is added, the yield or percent of ammonium carbamate dehydration is also reduced.

Finally, a group of processes is known, which completely separate the components of the mixed off-gas stream, usually by selective absorption. Either ammonia or carbon dioxide is completely absorbed, independent of the other component. Subsequent regeneration of the absorbent solution liberates a pure gas stream which is then readily recycled to the process. The residual component which remains in the off-gas stream after absorption is also independently recycled to the process. High power and thermal requirements due to the necessity of an extra absorption-regeneration cycle are a major objection to this type of process.

Thus a broad range of technical solutions to the problem of off-gas recycle is available. However, it has been unexpectedly found that according to the present invention high yields of urea can be obtained in a full recycle process without disadvantages inherent in other types of process as described above. The process which forms the subject of this invention provides a full utilization of ammonia and carbon dioxide in the synthesis and furthermore provides conservation of heat and power. Another significant advantage of the present invention is that water from an external source is not required to dissolve the recycling carbamate being returned to the synthesis step.

It is an object of this invention to provide an improved process of urea synthesis.

Another object is to produce urea in a complete recycle process which does not produce a net off-gas.

A further object is to process and recycle off-gas produced by ammonium carbamate decomposition in an improved and more efficient manner.

An additional object is to provide a urea synthesis process which permits recycle of unconverted material without addition of water from an external source into the process stream.

These and other objects of this invention will become apparent from the description which follows.

In the process according to this invention, the hot off-gas stream containing ammonia, carbon dioxide and water vapor is contacted with a cool recirculating aqueous ammonium carbamate solution containing excess ammonia. This contact is accomplished by scrubbing the gas stream in the lower packed section of a condenser-stripper vessel. The scrubbing step condenses the major portion of water vapor from the gas stream together with some ammonia, however, the most important effect of this step is that it strips most of the carbon dioxide content from the gas stream, thus leaving an ammonia-rich gas stream. The residual ammonia-rich gas stream is further scrubbed in additional packed and bubble-cap sections, leaving an ammonia exit gas free of carbon dioxide. This ammonia gas stream is separately condensed and recycled to the process in the ammonia feed section.

The initial scrubbing step cools the gas stream as well as condensing and stripping water, ammonia, and carbon dioxide. The scrubbing liquid, thus heated, is externally cooled and recycled. A portion of this liquid is drawn off as a concentrated ammonium carbamate solution product, and is subsequently recycled to urea synthesis to join the main stream of ammonium carbamate formed by reacting incoming ammonia and carbon dioxide. The purified overhead ammonia gas stream is readily condensed to liquid ammonia without solids formation. Thus two liquid streams are recycled, with low heat losses and reduced power requirements. The only streams leaving the system are the product urea solution and the inerts discharged after the aforementioned ammonia condensation. Excessive dilution of process streams is avoided, since no additional external components are added to the process.

Although this procedure may be applied to any off-gas derived from carbamate decomposition, it is most suitable and provides greatest improvements in process efficiency when combined with the urea synthesis process disclosed in co-pending U.S. patent application Serial No. 798,399, filed March 10, 1959, now abandoned, in which two stages of ammonium carbamate decomposition are involved. In this two-stage process, the off-gas from the first stage is contacted with and partially absorbed by an aqueous absorbent stream of ammonia-ammonium carbamate solution. This contact between the first stage off-gas and the liquid solution results in the generation of heat, and takes place while in heat exchange with the urea stream in the second stage of carbamate decomposition. The mixed gas-liquid stream resulting from this gas-liquid contact is scrubbed and the final gas phase is combined with the off-gas from the second stage of decomposition. The combined off-gas stream is then passed through the condenser-stripper, whereby an ammonia-rich gas stream free of carbon dioxide and a residual aqueous ammonia-ammonium carbamate solution are produced and recycled to the urea synthesis process.

A detailed description of the operation of the process of the present invention follows. Referring to the figure, incoming carbon dioxide feed stream 1 and ammonia stream 3 are passed into high pressure urea synthesis reactor 9, with total ammonia feed stream 3 consisting of incoming stream 2 combined with recycle ammonia stream 4. Recycle stream 7, consisting of a concentrated aqueous ammonia-ammonium carbamate solution, is also passed into reactor 9. Within reactor 9, ammonia and carbon dioxide combine to form ammonium carbamate, and a portion of the ammonium carbamate dehydrates to yield urea. The pressure and temperature ranges for urea synthesis within reactor 9 are well known, thus the pressure within reactor 9 will be between about 2000 to 6000 p.s.i.g. while the temperature will be in a range between about 320° F. to 430° F. Reactor 9 may be suitably disposed to provide either horizontal or vertical flow of reactants, and in fact reactor 9 may even consist of two vessels with premixing of ammonia and carbon dioxide as described in U.S. patent application No. 798,399 cited supra. The overall molar feed ratio of reactants is also a matter of selection and may vary from the stoichiometric 2 to 1 molar ratio of ammonia to carbon dioxide up to about 5 to 1 or even higher. In general, ratios higher than about 5 to 1 are considered not economical from a practical point of view, since it becomes necessary to provide a special vessel for the separation of the large quantity of excess ammonia present in the reactor effluent under such conditions prior to ammonium carbamate decomposition. Of course it should be understood that the process of the present invention is also readily applicable to such processes, as will appear from the following section of the process description.

The process stream now leaves reactor 9 via line 10. this stream will contain about 20% to 40% urea, with the balance consisting mainly of ammonium carbamate, ammonia and water. Specific proportions of these components will be a function of the aforementioned operating variables. The stream 10 is first passed through pressure reducing valve 11 whereby process stream pressure is reduced to a level of between about 200 p.s.i.g. to 400 p.s.i.g., prior to the first stage of ammonium carbamate decomposition. The specific pressure selected will depend on engineering considerations in a particular case. The stream now passes via line 12 to vessel 13, which is the first stage of a two-stage ammonium carbamate decomposition system. Vessel 13 is a steam-heated shell and tube head exchanger, with steam entering the shell via 14 and condensate leaving via 15. The process stream 12 passes through the tubes of vessel 13, and due to the application of heat at the reduced pressure a major portion of the ammonium carbamate present decomposes into ammonia and carbon dioxide. The temperature of the process stream inside vessel 13 will depend on the particular operating pressure. Thus at 400 p.s.i.g., stream temperature will be from about 275° F. to 300° F., while at 200 p.s.i.g. the stream temperature will be maintained from about 240° F. to 265° F. Lower temperature is feasible at the lower pressure since ammonium carbamate is more readily decomposed at a lower pressure. The resulting process stream leaves via 16 and passes into decomposer separator 17.

Vessel 17 is a known type of gas-liquid separator, in which stream 16 is divided into a liquid stream 18 consisting of urea, water and residual ammonium carbamate, and a gas stream 19 containing excess ammonia plus ammonia and carbon dioxide derived from the first stage of carbamate decomposition. The impure liquid product stream 18 is passed through pressure reducing valve 20, whereby stream pressure is further reduced to a suitable level for final and complete ammonium carbamate decomposition. A pressure level in the range between 5 p.s.i.g. to 50 p.s.i.g. is suitable for this second and final stage of decomposition.

The product stream, now at a suitable reduced pressure, passes via 21 into the second stage ammonium carbamate decomposer vessel 22. Vessel 22 is similar in design and function to vessel 13 previously described. Heat is provided for the shell side of vessel 22 by contacting off-gas stream 19 with an aqueous ammonia-ammonium carbamate solution 24 obtained from a later stage of the process. Streams 19 and 24 are passed via 23 into the shell side of vessel 22 at a temperature between about 250° F. to 350° F., and subsequently leave vessel 22 via line 26 as a mixed gas-liquid stream. Gas absorption and reaction takes place when streams 19 and 24 are combined. This liberates heat which accomplishes the final decomposition of residual ammonium carbamate present in stream 21 at a stream temperature between about 150° F. to 230° F. As previously discussed in connection with the first stage of decomposition, operating temperature is primarily a function of pressure. The urea product stream now leaves vessel 22 via 25, and passes into vessel 27 which is a liquid-gas separator of design and function similar to unit 17 previously described. The product urea solution, containing minute quantities of ammonia and carbon dioxide, is passsed to urea finishing operations via 28.

A final off-gas stream, derived from the second stage decomposition and containing ammonia, carbon dioxide and water vapor, is removed via 29 and is combined with the residual off-gas stream 30. Stream 30 is indirectly derived from the first stage of ammonium carbamate decomposition by the scrubbing of stream 26 in vessel 59 in a manner to be subsequently described. The combined off-gas stream 31 is recovered at a pressure and temperature which correspond closely to conditions in the second stage of carbamate decomposition, with gas composition consisting primarily of ammonia, carbon dioxide and water vapor in proportions dependent upon operating variables. Usually the gas will contain about 40% ammonia, 25% carbon dioxide and 30% water vapor.

Gas stream 31 is passed into condenser-stripper vessel 32 below the lower packed section 33. Vessel 32 will usually contain a second upper packed section 34 for accurate temperature control, however section 34 may be omitted in certain cases if adequate process control is attainable and process upsets are prevented by suitable process control instrumentation. A bubble-cap section 35 is provided in the upper section of vessel 32, for final purification of the rising gas stream. The entering gas stream 31 passes upwards through packed sections 33 and 34 and bubble cap section 35. In each section the gas is scrubbed with an aqueous ammonia-ammonium carbamate solution, whereby carbon dioxide is removed from the gas. In section 33 the scrubbing also cools the gas stream, preferably to a temperature between about 125° F. to 140° F. This cooling serves to condense water vapor and some ammonia, and to remove most of the carbon dioxide from the gas stream. The lower the temperature to which the gas stream is cooled, the more water vapor and carbon dioxide will be removed. Thus above 140° F. an insufficient amount of carbon dioxide is removed from the gas stream, while below 125° F. the scrubbing solution may deposit solid carbamate.

The warmed aqueous solution collected at the bottom of vessel 32 at a temperature between about 130° F. to 145° F. consists essentially of a concentrated ammonium carbamate solution in equilibrium with excess ammonia, and contains about 32% ammonia, 32% carbon dioxide and 36% water. This solution is removed via line 41 and partially recycled via 69 with the balance passing to other parts of the process via 57. The solution in line 69 is first cooled in cooler 37 to a temperature between about 125° F. and 140° F., and is then recycled via 42 to vessel 32 above packed section 33. As previously described, its primary function is to cool and scrub the gas stream in packed section 33, thereby simultaneously condensing and removing carbon dioxide, together with water vapor and some ammonia.

The remaining gas stream now passes upwards through separator 36 and enters packed section 34. Separator 36 serves to recover down-flowing liquid solution from 34, while allowing upward gas flow. Packed section 34 has a function and operation similar to packed section 33 previously described. The gas stream enters the bottom of section 34 with a carbon dioxide content of about 5%, and consists mostly of ammonia. The scrubbing solution in section 34 is a dilute ammonium carbamate solution containing excess ammonia, and is withdrawn via line 70 at a temperature below 120° F., cooled in cooler 38 to about 115° F. and then recycled via 44 to vessel 32, above section 34. Thus section 34 differs from section 33 in having a lower temperature level and a weaker scrubbing solution. The carbon dioxide content of the gas stream is lowered from about 5% to about 0.3% to 0.5% by the scrubbing step in section 34.

The gas stream now passes upwards through bubble cap section 35. A temperature gradient is maintained in section 35, with the top plate being cooled to a liquid phase temperature of about 50° F. or less, either by cooling coils or by flashing in a slight amount of ammonia via 39. Thus the liquid phase on the top tray is a strong cold ammonia solution containing about 55% ammonia, with only a very minor carbon dioxide content, while the liquid phase on the bottom tray is warm and lower in free ammonia, but contains about 10% to 20% ammonium carbamate. The gas stream is thus essentially freed of carbon dioxide content in section 35, and leaves unit 32 via line 50 at a temperature between about 50° F. to 75° F. as ammonia gas with less than 100 p.p.m. carbon dioxide, together with about 1% by weight of water vapor. Inert gases are also removed from the system in gas stream 50. An equivalent small water makeup stream 40 serves to maintain the water balance on the system, since the water removed via line 50 is subsequently eliminated from the process during compression. The maximum allowable gas temperature at the top of section 35 is primarily a function of pressure. Thus if unit 32 is operated at 15 p.s.i.g., the outlet gas temperature must be maintained below 80° F. to insure complete removal of carbon dioxide. At 50 p.s.i.g., the maximum allowable temperature is 85° F. In any case, the gas must be cooled to below 100° F. with lower temperature being required at lower pressures.

The recovered ammonia stream 50 is partially compressed in recovered ammonia compressor 67 and is then passed via 68 into cooler-condenser 51, which is cooled by coolant admitted via 52 and removed via 53. Essentially all of the ammonia is condensed to liquid which leaves via 55. A purge stream 54 containing inerts is refrigerated for ammonia recovery, not shown, and is discharged to a stack. The liquid ammonia stream 55 is brought to urea synthesis pressure in pump 56 and returned to urea synthesis via 4.

Returning to vessel 32, as a result of the aforementioned processing there is a net recovery of liquid solution as well as the pure overhead ammonia gas stream 50. Thus the liquid solution 41 is divided into two portions. The recycle stream 69, derived from 41, is returned to unit 32 as previously described. The balance of stream 41 is recycled via 57 to the urea synthesis process. Thus the overall operation of vessel 32 divides the incoming stream 31 into two portions, pure ammonia stream 50 and stream 57 containing about 32% ammonia, 32% carbon dioxide and 36% water.

Referring now to vessel 22, the second stage of ammonium carbamate decomposition, shell side input stream 24 is derived from stream 57. The reaction of streams 24 and 19, admitted via 23, in addition to producing heat in the shell side of 22 also results in the formation of a mixed gas-liquid stream 26. Stream 26 is passed into gas scrubber-absorber 59. Unit 59 is a packed gas-liquid scrubber provided with a packed section 60 and a liquid reservoir section 61, and operated at a pressure level essentially equal to that of the first stage of ammonium carbamate decomposition. The gaseous component of stream 26 is scrubbed in section 60 while the liquid component joins solution 61, which consists of a concentrated aqueous ammonia-ammonium carbamate solution. Scrubbing of the gas in 60 removes most of the ammonia and carbon dioxide present in the gas, and the residual off-gas containing inerts is removed via 30 and joins stream 29 to form combined off-gas stream 31 which is processed as previously described.

A portion of the liquid solution 61 is recycled to the top of vessel 59 as a scrubbing agent. This portion is removed via 62, cooled in cooler 63 which is cooled by cooling water admitted via 64 and removed via 65, and finally admitted to the top of vessel 59 via 66. An additional source of scrubbing liquid for vessel 59 is stream 58, which is derived from stream 57 previously described. The level of liquid solution 61 within vessel 59 is maintained by removing a portion of rich scrubbing liquid via 43. Stream 43 is recycled to urea synthesis via high-pressure liquid pump 45. The liquid stream thus leaves 46 at urea synthesis pressure, and passes through heater 47 which is heated by steam admitted via 48 with condensate removal via 49. The liquid stream, now at urea synthesis conditions, is recycled via 7 to the urea synthesis reactor 9.

A preferred embodiment of the invention as applied in an industrial installation will now be described. In the following description, all flows are lbs./hr. unless otherwise specified.

The urea synthesis reactor was operated at 3500 p.s.i.g. and about 365° F., and received process flow streams consisting of 3100 ammonia, 3130 carbon dioxide, and a recycle solution from the scrubber-absorber containing 3220 carbon dioxide, 4500 ammonia and 1600 water. Thus a total molar feed ratio of 3.1 mols ammonia to 1 mol carbon dioxide was employed. The reactor effluent was recovered at 365° F., and contained 4160 urea, 2850 water, 5850 carbamate and 2690 ammonia.

The process stream pressure was reduced to 300 p.s.i.g., and the stream passed through the first stage of ammonium carbamate decomposition at a temperature of 266° F. After separation, the off-gas contained 3740 ammonia, 2110 carbon dioxide and 360 water vapor, while the liquid stream contained 4160 urea, 2490 water, 1510 ammonia and 1190 carbon dioxide. Part of the ammonia and carbon dioxide in the liquid stream were combined as ammonium carbamate. The liquid stream was passed through the second stage of carbamate decomposition at a temperature of 212° F. and pressure of 15 p.s.i.g. After separation, the off-gas from the second stage contained 1410 ammonia, 1110 carbon dioxide and 1240 water vapor, while the product urea solution contained 4160 urea, 1250 water and minute quantities of ammonia and carbon dioxide.

The off-gas from the first stage decomposer was reacted in the shell of the second stage decomposer with a recycled absorbent solution from the condenser-stripper, thereby developing a temperature of 260° F. at 230 p.s.i.g. The absorbent solution contained about 32% ammonia, 32% carbon dioxide and 36% water. The resulting mixed gas-liquid solution was passed into the gas scrubber-absorber, and the residual unabsorbed gas from this scrubber was combined with the off-gas from the second stage decomposition to give a final off-gas containing, by weight percent, 42% ammonia, 27% carbon dioxide and 30% water vapor. Actual total flow rate was 4133 lbs./hr. This combined off-gas stream was at 212° F. and 15 p.s.i.g., and was passed into the condenser stripper below the lower packed section. The residual gas stream above this section was at a temperature of 135° F., and contained 5% carbon dioxide, 2.5% water vapor, with the balance ammonia and inerts. This gas stream was further cooled and scrubbed in the upper packed section at a temperature of about 115° F., as a result of which the carbon dioxide content of the gas was further lowered from about 5% to 0.3%.

The remaining gas stream, now consisting almost completely of ammonia, was freed of residual carbon dioxide by passing upwards through the bubble cap sections. The liquid phase on the bottom tray was relatively warm, with an equilibrium temperature of about 100° F. This solution contained 10% ammonium carbamate. Each succeeding tray in an upwards direction was colder than the previous one, with the top tray solution at a temperature of 70° F. The solution on this tray contained about 55% ammonia and less than 1% ammonium carbamate. The solution was cooled and maintained at 70° F. by ammonia injection. The equilibrium product gas stream above the top tray was at 75° F. and contained only 50 p.p.m. of carbon dioxide. This gas stream, essentially pure ammonia, was compressed and liquefied by cooling to remove inerts, and finally recycled to urea synthesis feed. Recycle feed rate was 643 lbs./hr. of ammonia.

A portion of the absorbent solution derived from the bottom of the condenser-stripper was recycled to the top of the lower packed section, while most of the balance was admitted to the absorber-scrubber and utilized as a gas scrubbing medium. A small stream of this solution was contacted with the first stage off-gas as previously described. Total net solution withdrawn from the condenser-stripper unit contained 1110 carbon dioxide, 1110 ammonia and 1250 water. A portion of the rich solution withdrawn from the bottom of the absorber-scrubber was recycled to urea synthesis as previously described, while another portion was cooled and recirculated to the top of the unit thus maintaining a scrubbing temperature of about 140° F., with an operating pressure of 250 p.s.i.g.

The above discussion of a preferred embodiment of this invention is intended primarily for descriptive purposes, and should not be interpreted to limit or restrict the invention.

Various modifications and alterations in the heat transfer and heat recovery systems, as well as known processing modifications found in the prior art, may be readily applied and utilized in conjunction with this invention.

We claim:

1. In a process for urea synthesis which comprises reacting ammonia, carbon dioxide and recycle aqueous ammonium carbamate solution at highly elevated pressure, reducing the pressure of the resulting urea-containing process stream to an intermediate level, heating the process stream to decompose a portion of the contained ammonium carbamate, separating a first off-gas comprising ammonia, carbon dioxide and water vapor, further reducing the pressure of the residual urea-containing process stream to a lower level, further heating the residual process stream to decompose the balance of contained ammonium carbamate, separating a second off-gas comprising ammonia, carbon dioxide and water vapor from the final residual process stream, said final residual process stream comprising product aqueous urea solution, the improved process of recycling said first and second off-gas streams to urea synthesis which comprises reacting said first off-gas at said intermediate pressure level with pressurized aqueous ammonia-ammonium carbamate solution, whereby said first off-gas is partially absorbed into said solution and said solution is concentrated by absorption of ammonia and carbon dioxide from said first off-gas, recycling said concentrated solution to urea synthesis as said recycle aqueous ammonium carbamate solution, combining residual unabsorbed first off-gas with said second off-gas at said lower pressure level, scrubbing the resulting mixed off-gas with cold aqueous ammonia-ammonium carbamate solution whereby said mixed off-gas is cooled and a portion thereof is condensed and absorbed into said solution and said solution is heated, further cooling and refluxing the residual gas portion of said mixed off-gas whereby substantially all carbon dioxide is removed from said residual gas, compressing said residual gas comprising ammonia free of carbon dioxide and recycling said ammonia to urea synthesis, cooling and recycling a portion of said aqueous ammonia-ammonium carbamate solution to said scrubbing of mixed off-gas, pressurizing the balance of said solution to said intermediate pressure level, and reacting said solution with said first off-gas as said pressurized aqueous ammonia-ammonium carbamate solution.

2. Process of claim 1, in which the mixed stream which is produced when said first off-gas is reacted with aqueous ammonia-ammonium carbamate solution, is cooled by heat exchange with the residual urea-containing process stream at said lower pressure level, whereby said residual process stream is heated and the balance of contained ammonium carbamate is decomposed.

3. In a process for urea synthesis which comprises reacting ammonia, carbon dioxide and recycle aqueous ammonium carbamate solution in an overall ammonia-carbon dioxide molar ratio between 2 to 1 and 5 to 1 and at urea synthesis pressure between 2000 p.s.i.g. and 6000 p.s.i.g. and temperature between 320° F. and 430° F., reducing the pressure of the resulting urea-containing process stream to an intermediate level in the range of 200 p.s.i.g. to 400 p.s.i.g., heating the process stream at a temperature between 240° F. and 300° F. whereby a major portion of the contained ammonium carbamate is decomposed, separating a first off-gas comprising ammonia, carbon dioxide and water vapor, further reducing the pressure of the residual urea-containing process stream to a final level in the range of 5 p.s.i.g. to 50 p.s.i.g., further heating the residual process stream at a temperature between 150° F. and 250° F. to decompose the balance of contained ammonium carbamate, separating a second off-gas comprising ammonia, carbon dioxide and water vapor from the final residual process stream, said final residual process stream comprising product aqueous urea solution, the improved process of recycling said first and second off-gas streams to urea synthesis which comprises reacting said first off-gas with pressurized aqueous ammonia-ammonium carbamate solution at said intermediate pressure level and a temperature between 250° F. and 350° F., whereby said first off-gas is partially absorbed into said solution and said solution is concentrated by absorption of ammonia and carbon dioxide from said first off-gas, recycling said concentrated solution to urea synthesis as said recycle aqueous ammonium carbamate solution, combining residual unabsorbed first off-gas with said second off-gas at said final pressure level, scrubbing the resulting mixed off-gas with aqueous ammonia-ammonium carbamate solution whereby said mixed off-gas is cooled to a temperature between 125° F. and 140° F. and a portion thereof is condensed and absorbed into said solution, said solution being heated from an initial temperature between 110° F. and 140° F. to a final temperature between 115° F. and 145° F. by said scrubbing step, further cooling and refluxing the residual gas portion of said mixed off-gas to a final temperature below 100° F. whereby substantially all carbon dioxide is removed from the residual off-gas, compressing the residual off-gas comprising ammonia free of carbon dioxide and recycling said ammonia to urea synthesis, cooling and recycling a portion of said aqueous ammonia-ammonium carbamate solution to said scrubbing of mixed off-gas, pressurizing the balance of said solution to said intermediate pressure level, and reacting said solution with said first off-gas as said pressurized aqueous ammonia-ammonium carbamate solution.

4. Process of claim 3, in which said scrubbing of mixed off-gas is carried out in two stages of scrubbing, and wherein a more dilute solution is employed at a lower temperature level in the second stage.

5. Process of claim 4, in which said first stage of scrubbing employs aqueous ammonia-ammonium carbamate solution at a temperature between 125° F. and 140° F. and said second stage of scrubbing employs dilute aqueous ammonia-ammonium carbamate solution at a temperature between 110° F. and 115° F.

6. In a process for urea synthesis which comprises reacting ammonia, carbon dioxide and recycle aqueous ammonium carbamate solution at highly elevated pressure, reducing the pressure of the resulting urea-containing process stream, heating said process stream to decompose contained ammonium carbamate, and separating an off-gas comprising ammonia, carbon dioxide and water vapor from the residual liquid process stream containing product urea, the complete recycle process for dividing said off-gas into a pure ammonia gas stream free of carbon dioxide and aqueous ammonium carbamate solution, followed by recycle of said components to urea synthesis, which comprises (1) condensing a portion of said off-gas by scrubbing the off-gas with cold aqueous ammonium carbamate solution, whereby said off-gas is cooled and a portion thereof is combined into said solution, and said solution is warmed,
(2) refluxing and cooling the residual off-gas stream to a lower temperature to remove substantially all carbon dioxide from the off-gas as ammonium carbamate solution and produce a final off-gas stream of pure ammonia,
(3) compressing and recycling the pure ammonia off-gas from step (2) to urea synthesis,
(4) cooling a portion of the warmed aqueous ammonium carbamate solution from step (1) and recycling said cooled portion to step (1), and
(5) compressing and recycling the balance of the warmed aqueous ammonium carbamate solution from step (1) to urea synthesis.

References Cited in the file of this patent
UNITED STATES PATENTS

| | | |
|---|---|---|
| 1,962,525 | Richardson | June 12, 1934 |
| 2,116,881 | De Ropp | May 10, 1938 |
| 2,701,262 | Cook | Feb. 1, 1955 |
| 2,777,877 | Fauser | Jan. 15, 1957 |
| 2,807,574 | Hirano et al. | Sept. 24, 1957 |
| 2,848,493 | Dewling et al. | Aug. 19, 1958 |
| 2,913,493 | Sze et al. | Nov. 17, 1959 |
| 2,946,726 | Markels | July 7, 1960 |
| 2,954,330 | Schmieding | July 27, 1960 |

FOREIGN PATENTS

| | | |
|---|---|---|
| 205,506 | Austria | Oct. 10, 1959 |
| 535,406 | Canada | Jan. 7, 1956 |
| 538,743 | Canada | Aug. 7, 1956 |
| 560,612 | Canada | July 22, 1958 |
| 1,076,312 | France | Apr. 21, 1954 |